US008251335B2

United States Patent
Kojima et al.

(10) Patent No.: US 8,251,335 B2
(45) Date of Patent: *Aug. 28, 2012

(54) VEHICULAR SEAT SLIDE DEVICE

(75) Inventors: Yasuhiro Kojima, West Bloomfield, MI (US); Hideo Nihonmatsu, Anjo (JP)

(73) Assignee: Aisin Seiki Kabushiki Kaisha, Kariya-shi (JP)

(*) Notice: Subject to any disclaimer, the term of this patent is extended or adjusted under 35 U.S.C. 154(b) by 163 days.

This patent is subject to a terminal disclaimer.

(21) Appl. No.: 12/677,316

(22) PCT Filed: Sep. 8, 2008

(86) PCT No.: PCT/JP2008/066154
§ 371 (c)(1),
(2), (4) Date: Mar. 10, 2010

(87) PCT Pub. No.: WO2009/037988
PCT Pub. Date: Mar. 26, 2009

(65) Prior Publication Data
US 2010/0314523 A1 Dec. 16, 2010

(30) Foreign Application Priority Data
Sep. 21, 2007 (JP) ................................. 2007-245625

(51) Int. Cl.
*F16M 13/00* (2006.01)
(52) U.S. Cl. .......... 248/429; 248/424; 248/430; 384/47; 296/65.11; 296/65.13
(58) Field of Classification Search .................. 248/424, 248/429, 430; 384/34, 47; 296/65.01, 65.11, 296/65.13; 297/311, 331
See application file for complete search history.

(56) References Cited

U.S. PATENT DOCUMENTS

| 4,601,455 A | 7/1986 | Lowe et al. |
| 6,364,272 B1 | 4/2002 | Schüler et al. |

(Continued)

FOREIGN PATENT DOCUMENTS

| DE | 198 04 506 A1 | 8/1999 |
| EP | 1 389 557 A1 | 2/2004 |
| JP | 3 51625 | 5/1991 |
| JP | 4 48033 | 4/1992 |
| JP | 2006 298104 | 11/2006 |

OTHER PUBLICATIONS

U.S. Appl. No. 12/675,435, filed Feb. 26, 2010, Kojima, et al. U.S. Appl. No. 12/594,357.
Extended European Search Report issued Apr. 29, 2011, in European Patent Application No. 08832574.1.

*Primary Examiner* — Todd M Epps
(74) *Attorney, Agent, or Firm* — Oblon, Spivak, McClelland, Maier & Neustadt, L.L.P.

(57) ABSTRACT

A lower rail 3 has a first cut-and-raised piece 22, and an upper rail 4 has a second cut-and-raised piece 23. The first and second cut-and-raised pieces 22, 23 each have a facing surface 22a, 23a that faces and is contactable with the facing surface of the other cut-and-raised piece along the moving direction of the upper rail 4. The first and second cut-and-raised pieces 22, 23 are engaged with each other so as to limit the movement range of the upper rail 4 relative to the lower rail 3. On the facing surface 22a and the facing surface 23a, inclination angles α and β are provided that generate a force causing the first and second cut-and-raised pieces 22, 23 to be more deeply engaged with each other, respectively. This prevents the first and second cut-and-raised pieces 22, 23 from being easily disengaged from each other.

4 Claims, 3 Drawing Sheets

U.S. PATENT DOCUMENTS

| | | |
|---|---|---|
| 7,506,856 B2 * | 3/2009 | Ikegaya et al. ............... 248/430 |
| 7,594,635 B2 * | 9/2009 | Kojima et al. ............... 248/429 |
| 7,992,834 B2 * | 8/2011 | Kojima et al. ............... 248/429 |
| 7,993,060 B2 * | 8/2011 | Kojima et al. ............... 384/47 |
| 8,033,520 B2 * | 10/2011 | Fujieda et al. ............... 248/430 |
| 2005/0224680 A1 * | 10/2005 | Strubel et al. ............... 248/429 |
| 2009/0080814 A1 | 3/2009 | Kojima et al. |
| 2010/0207419 A1 * | 8/2010 | Kojima et al. ............. 296/65.13 |

* cited by examiner

VEHICULAR SEAT SLIDE DEVICE

TECHNICAL FIELD

The present invention relates to a vehicle seat slide device.

BACKGROUND ART

Conventionally, an example of a vehicle seat slide device as described in Patent Document 1 has been known. Such a vehicle seat device includes a pair of lower rails fixed on a vehicle floor and a pair of upper rails fixed to a seat. The upper rails are supported by the lower rail to be movable relative to the lower rails. Each lower rail has a pair of plate-like stoppers at a center portion in the longitudinal direction. The stoppers are formed by cutting and raising parts of the bottom wall of the lower rail. On the other hand, each upper rail has a pair of plate-like stoppers at either end in the longitudinal direction. The stoppers are formed by cutting and raising parts of the vertical walls of the upper rail. The stoppers at each end of the upper rails can contact and be engaged with the stoppers of the lower rails along the moving direction of the upper rails, so that the range of movement (slide stroke) of the upper rails relative to the lower rails is limited.

In the seat slide device of the above publication, the impact of contact between the stoppers can elastically deform the stoppers so that the engaging position between the stoppers is displaced toward the stopper distal ends (free ends), that is, in a direction disengaging the stoppers from each other. In this case, it is possible that the movement range of the upper rails relative to the lower rails cannot be limited.

Patent Document 1: Japanese Laid-Open Patent Publication No. 2006-298104

SUMMARY

According to one aspect of the present invention, a vehicle seat slide device is provided that includes a lower rail that is adapted to be fixed to a floor of a vehicle, an upper rail that is adapted to be fixed to a vehicle seat and is supported by the lower rail to be movable relative to the lower rail, a first stopper provided to the lower rail, and a second stopper provided to the upper rail. The first and second stoppers each have a facing surface that faces and is contactable with the facing surface of the other stopper along the moving direction of the upper rail. The first and second stoppers are engaged with each other so as to limit the movement range of the upper rail relative to the lower rail. On at least one of the facing surfaces of the first and second stoppers, an inclination angle is provided that generates a force causing the first and second stoppers to be more deeply engaged with each other.

More specifically, the inclination angle is an angle relative to a plane perpendicular to the moving direction of the upper rail.

In accordance with another aspect of the present invention, the first stopper has a fixed end, which is fixed to the lower rail, and a free end, and the second stopper has a fixed end, which is fixed to the upper rail, and a free end. At least one of the facing surfaces of the first and second stoppers is inclined relative to a plane perpendicular to the moving direction of the upper rail such that the free end projects in the moving direction of the upper rail further toward the other facing surface than the fixed end.

According to the present invention, when the first and second stoppers are engaged with each other, the inclination angle generates a force causing the first and second stoppers to be more deeply engaged with each other. Accordingly, the first and second stoppers are prevented from being easily disengaged from each other, so that the range of movement of the upper rail relative to the lower rail is more reliably limited.

In accordance with another aspect of the present invention, the inclination angle is provided on each of the facing surfaces of the first and second stoppers, and the facing surfaces are in surface contact with each other when the first and second stoppers are engaged with each other.

According to this structure, the first and second stoppers are more firmly engaged with each other than a case where the facing surfaces of the first and second stoppers are in point contact or line contact with each other.

In accordance with another aspect of the present invention, the inclination angle is set to such a value that, when the first and second stoppers are engaged with each other, the load applied from one stopper to the other in the moving direction of the upper rail is dispersed in a direction toward the fixed end of the other stopper.

In accordance with another aspect of the present invention, the first stopper is a first cut-and-raised piece that is formed by cutting and raising a part of the lower rail, and the second stopper is a second cut-and-raised piece that is formed by cutting and raising a part of the upper rail. The first and second cut-and-raised pieces are engageable with each other in a shearing direction of each cut-and-raised piece.

This structure reduces the number of components compared to a case where, for example, the first and second stoppers are provided as members separate from the lower rail and the upper rail. Since the first and second stoppers receive the load generated when being engaged with each other in the shearing direction of each stopper, the stoppers have a sufficient strength compared to a case where, for example, the load is received in a bending direction. This allows the first and second stoppers to be small and thin, thereby reducing the size of the entire device.

DETAILED DESCRIPTION OF THE PREFERRED EMBODIMENTS

Hereinafter, a preferred embodiment of the present invention will be described with reference to drawings.

Figure 1:
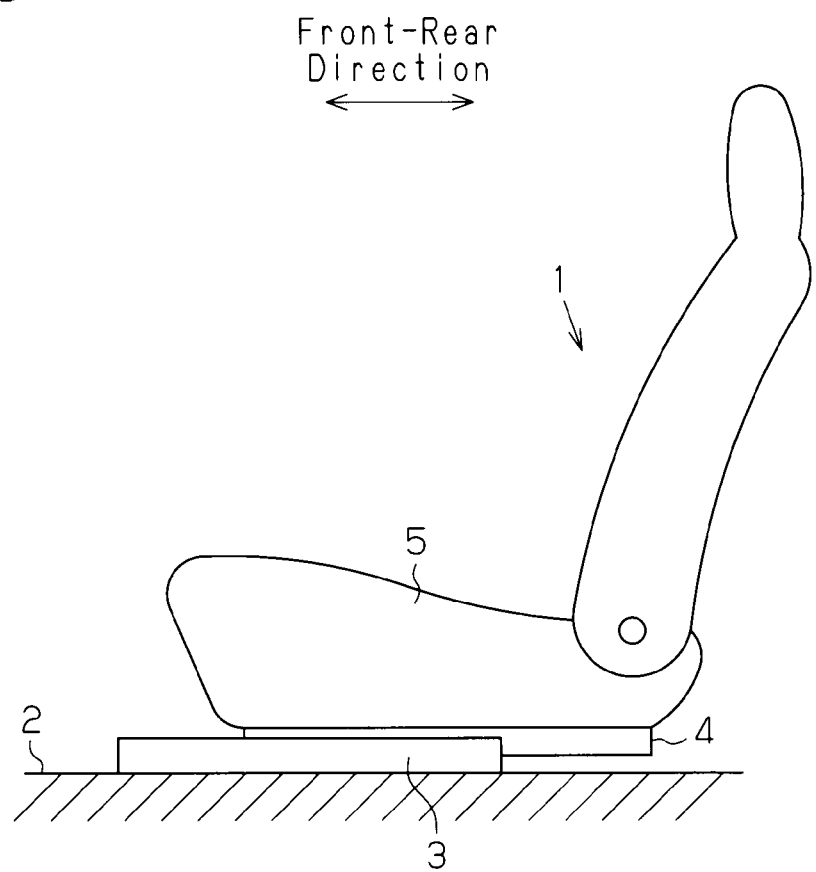
FIG. 1 is a side view illustrating a vehicle seat on which a seat slide device according to one embodiment of the present invention is mounted.

FIG. 1 schematically shows a vehicle seat 1, which is mounted, for example, on a vehicle, and a seat slide device, which slidably supports the seat 1 on a vehicle floor 2. The seat slide device includes a pair of lower rails 3 (only one of them is illustrated) and a pair of upper rails 4 (only one of them is illustrated). The lower rails 3 are fixed to the vehicle floor 2 and extend along the front-rear direction of the vehicle, and the upper rails 4 are fixed to a seat portion 5 of the vehicle seat 1. The upper rails 4 are movably assembled to the lower rails 3.

The lower rails 3 are arranged in parallel to each other and spaced at a predetermined interval along the widthwise direction of the vehicle seat 1 (the direction perpendicular to the elevation of FIG. 1). Likewise, the upper rails 4 are arranged in parallel to each other and spaced at a predetermined interval along the widthwise direction of the vehicle seat 1. FIG. 1 shows the lower rail 3 and the upper rail 4 that are arranged on the left side when facing forward of the vehicle. Movement of the upper rails 4 relative to the lower rails 3 is normally restricted by a locking member (not shown). The restriction is cancelled by applying an operating force to the locking member.

The seat slide device will now be described with reference to FIGS. 2 to 6.

Figure 2:
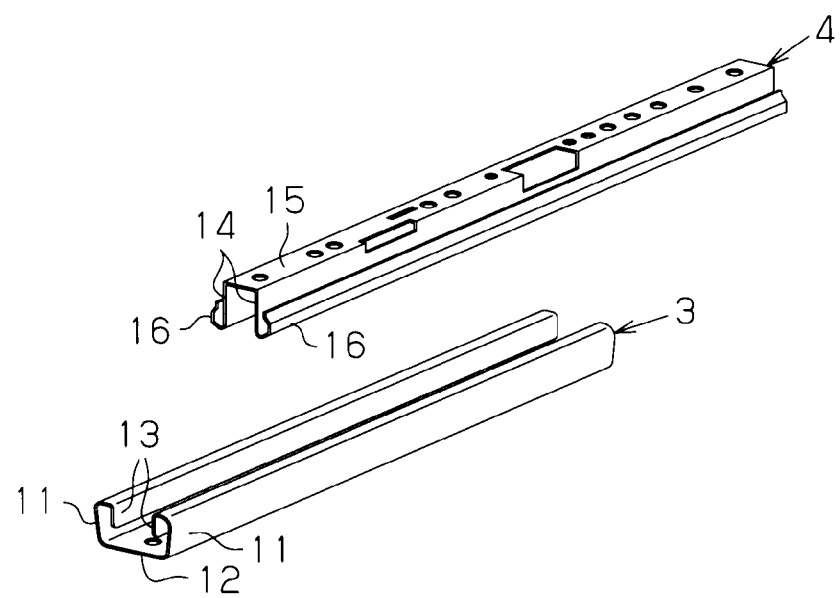
FIG. 2 is an exploded perspective view illustrating the seat slide device shown in FIG. 1.
Figure 4:
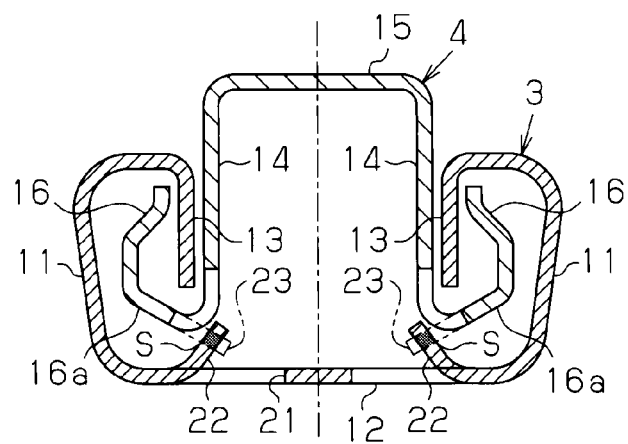
FIG. 4 is a cross-sectional view taken along line 4-4 of FIG. 3B.

As shown in FIGS. 2 and 4, the lower rail 3 has a pair of side wall portions 11 formed upright at edges in the widthwise direction and a bottom wall portion 12 coupling the side wall portions 11 to each other. Each side wall portion 11 has at its distal edge (upper edge) a folded-back wall portion 13, which extends inward along the widthwise direction of the lower rail 3 and then is folded back toward the bottom wall portion 12.

On the other hand, the upper rail 4 has a pair of side wall portions 14 and a top wall portion 15 coupling the side wall portions 14 to each other. The side wall portions 14 are located between the folded-back wall portions 13 of the lower rail 3 and extend vertically. Each side wall portion 14 has at its distal edge (lower edge) a folded-back wall portion 16, which extends outward along the widthwise direction and then is folded back to extend between the corresponding side wall portion 11 of the lower rail 3 and the corresponding folded-back wall portion 13. The proximal portion of each folded-back wall portion 16 forms an inclined wall portion 16a, which is inclined upward in relation to the side wall portion 14.

The lower rail 3 and the upper rail 4 substantially have a U-shaped cross-section, and are engaged with each other with their openings facing each other. The lower rail 3 and the upper rail 4 are prevented from being separated in the up-down direction mainly by the engagement between the folded-back wall portions 13, 16. The cross-sectional shape defined by the lower rail 3 and the upper rail 4 is substantially rectangular.

Rolling elements (not shown) are provided between each folded-back wall portion 16 and the facing side wall portion 11. The upper rail 4 is movable relative to the lower rail 3 along the longitudinal direction (the front-rear direction of the vehicle), while causing the rolling elements to roll.

Figure 5:
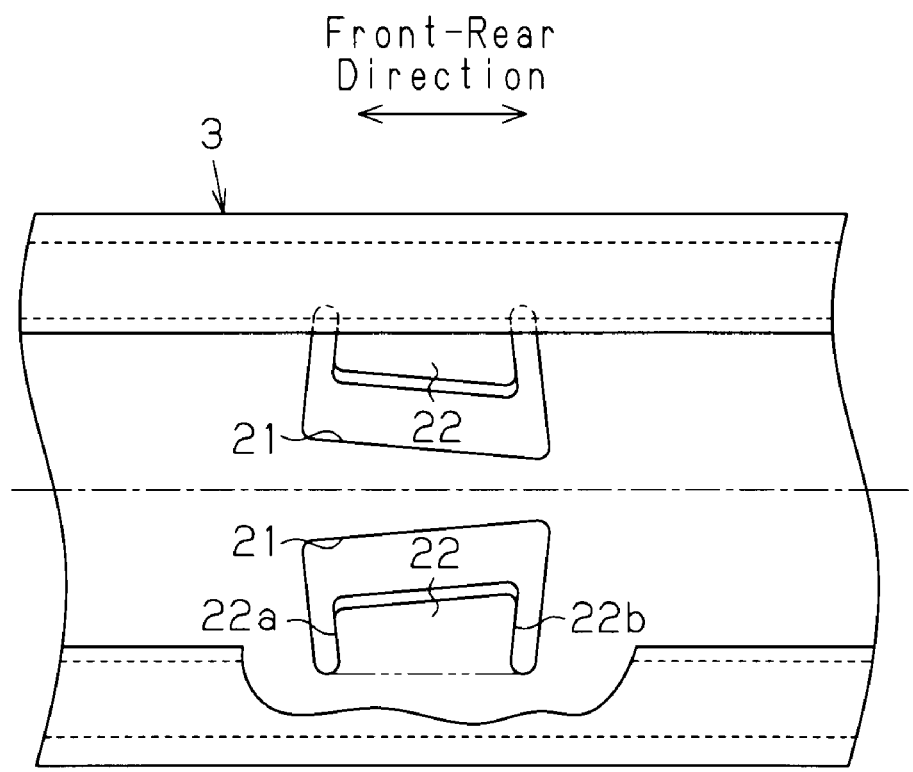
FIG. 5 is a plan view illustrating a lower rail.

As shown in FIGS. 4 and 5, a pair of U-shaped cut portions 21 facing in the opposite directions are formed at a center in the longitudinal direction of the bottom wall portion 12 of the lower rail 3. Each portion of the bottom wall portion 12 enclosed by one of the cut portions 21 is bent to form a predetermined angle with respect to the bottom wall portion 12, so as to form a rectangular plate-like first cut-and-raised piece 22 serving as a first stopper. The proximal end (fixed end) of each first cut-and-raised piece 22, that is, a part bent in relation to the bottom wall portion 12, shown by chain double-dashed line in FIG. 5. The bent part extends parallel with the longitudinal direction of the lower rail 3, that is, with the moving direction of upper rail 4 relative to the lower rail 3. Each first cut-and-raised piece 22 extends along the moving direction of the upper rail 4 relative to the lower rail 3. As shown in FIG. 4, a pair of the first cut-and-raised pieces 22 are inclined relative to the bottom wall portion 12 such that the space therebetween decreases toward the distal ends (free ends).

Figure 3A:
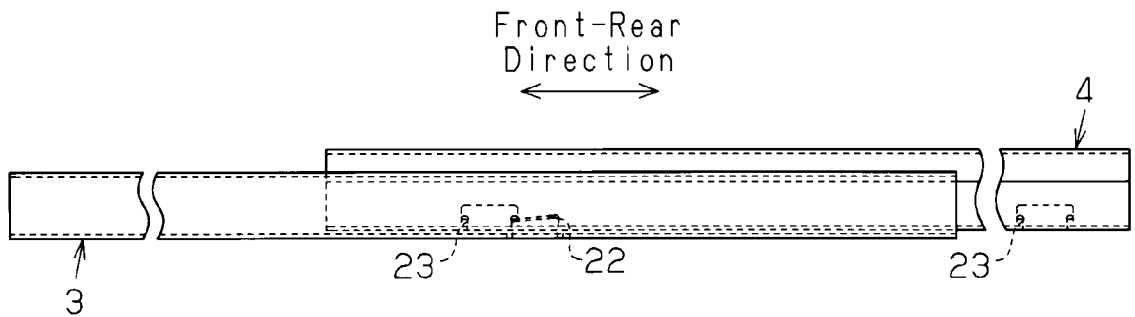
FIG. 3A is a side view illustrating the seat slide device shown in FIG. 1.
Figure 3B:
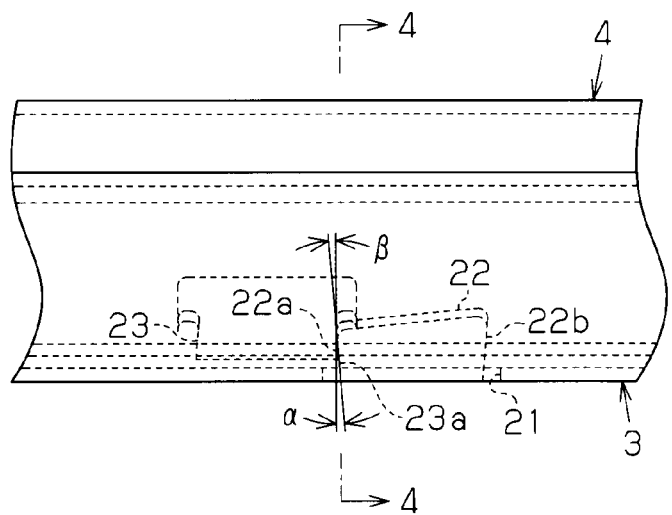
FIG. 3B is an enlarged view illustrating a part of the seat slide device shown in FIG. 3A.

As shown in FIG. 3B, the end surfaces of each first cut-and-raised piece 22 in the moving direction of the upper rail 4 form facing surfaces (engaging surfaces) 22a, 22b. The facing surfaces 22a, 22b are inclined by an inclination angle $\alpha$ relative to a plane perpendicular to the longitudinal direction of the lower rail 3 (that is, the moving direction of the upper rail 4), such that the width of the first cut-and-raised piece 22 in the longitudinal direction of the lower rail 3 increases from the proximal end toward the distal end of the first cut-and-raised piece 22. That is, each of the facing surfaces 22a, 22b is inclined such that the distal portion projects further in the longitudinal direction of the lower rail 3 than the proximal portion.

On the other hand, the upper rail 4 has at its either end in the longitudinal direction a pair of rectangular-plate shaped cut-and-raised pieces 23, which serve as a second stopper, as shown in FIG. 4. Each second cut-and-raised piece 23 is formed by cutting and raising a connecting portion between a side wall portion 14 and the corresponding folded-back wall portion 16. The second cut-and-raised pieces 23 at each end of the upper rail 4 extend diagonally downward along the inclined wall portions 16a, such that the space therebetween decreases from the proximal ends (the fixed ends) toward the distal ends (the free ends).

As shown in FIG. 3B, each second cut-and-raised piece 23 extends along the moving direction of the upper rail 4 relative to the lower rail 3. Each of the second cut-and-raised pieces 23 provided at a first end of the upper rail 4 has a facing surface (engaging surface) 23a, which faces the facing surface 22a of the corresponding first cut-and-raised piece 22 in the moving direction of the upper rail 4. Each of the second cut-and-raised pieces 23 provided at a second end of the upper rail 4 has a facing surface (engaging surface) 23a, which faces the facing surface 22b of the corresponding first cut-and-raised piece 22 in the moving direction of the upper rail 4. Each facing surface 23a is inclined by an inclination angle $\beta$ relative to a plane perpendicular to the longitudinal direction of the upper rail 4 (that is, the moving direction of the upper rail 4), such that the width of the second cut-and-raised piece 23 in the longitudinal direction of the upper rail 4 increases from the proximal end toward the distal end of the second cut-and-raised piece 23. That is, the facing surface 23a is inclined such that the distal portion projects further in the longitudinal direction of the upper rail 4 than the proximal portion. In the present embodiment, the inclination angle $\beta$ is equal the inclination angle $\alpha$.

The facing surface 23a of the second cut-and-raised piece 23 provided at the first end of the upper rail 4 can contact and engage with the facing surface 22a of the first cut-and-raised piece 22 provided on the lower rail 3, along the moving direction of the upper rail 4. The facing surface 23a of the second cut-and-raised piece 23 provided at the second end of the upper rail 4 can contact and engage with the facing surface 22b of the first cut-and-raised piece 22 provided on the lower rail 3, along the moving direction of the upper rail 4. This limits the movement range of the upper rail 4 relative to the lower rail 3.

The first and second cut-and-raised pieces 22, 23 are engaged with each other in a shearing direction, which is the same as the moving direction of the upper rail 4 (see FIG. 3B). The inclination angle $\alpha$ of the facing surface 22a (22b) and the inclination angle $\beta$ of the facing surface 23a are determined such that the facing surface 22a (22b) and the facing surface 23a cooperate to strengthen the engagement between the first and second cut-and-raised pieces 22, 23. That is, the inclination angles α, β are determined such that component forces are generated that act in directions to allow the first and second cut-and-raised pieces 22, 23 to be more deeply engaged based on the load at the engagement. The inclination angles α, β are set to such values that, when the first and second cut-and-raised pieces 22, 23 are engaged with each other, the load applied from one of the cut-and-raised pieces 22, 23 to the other in the moving direction of the upper rail 4 is dispersed in a direction toward the fixed end of the other cut-and-raised piece.

Figure 6:
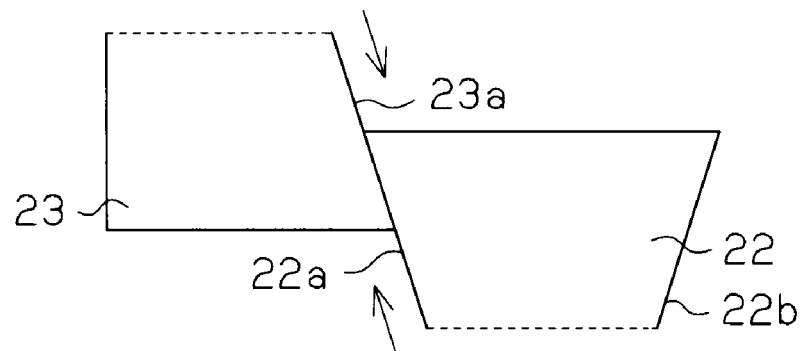
FIG. 6 is a developed diagram showing the engaged state of the first and second cut-and-raised pieces.

FIG. 6 is a developed diagram showing the engaged state of the first and second cut-and-raised pieces 22, 23. As shown in the drawing, since the facing surfaces 22a, 23a, which are engaged with each other, are given the inclination angles α, β, respectively, the force that directs the engaging position between the first and second cut-and-raised pieces 22, 23 toward the proximal portions of the cut-and-raised pieces 22, 23, that is, the force in a direction causing the cut-and-raised pieces 22, 23 to be more deeply engaged with each other, acts on the cut-and-raised pieces 22, 23. Therefore, the engagement between the first and second cut-and-raised pieces 22, 23 is prevented from being cancelled by the impact of the engagement.

Further, the facing surface 22a (22b) and the facing surface 23a are set so as to contact each other in a rectangular plane S (see FIG. 4) when the first and second cut-and-raised pieces 22, 23 are engaged with each other. That is, the facing surface 22a (22b) and the facing surface 23a are in surface contact with each other. This allows the first and second cut-and-raised pieces 22, 23 to be further firmly engaged with each other.

The above described embodiment has the following advantages.

(1) When the first and second cut-and-raised pieces 22, 23 are engaged with each other, the inclination angles α, β cause the first and second cut-and-raised pieces 22, 23 to receive a force in a direction causing the first and second cut-and-raised pieces 22, 23 to be more deeply engaged with each other. Accordingly, the cut-and-raised pieces are prevented from being easily disengaged from each other, so that the range of movement of the upper rail 4 relative to the lower rail 3 is more reliably limited.

(2) The inclination angle α is set on each of the facing surfaces 22a, 22b of the first cut-and-raised piece 22, and the inclination angle β is set on the facing surface 23a of the second cut-and-raised piece 23. The facing surface 22a (22b) and the facing surface 23a contact each other in the plane S when the first and second cut-and-raised pieces 22, 23 are engaged with each other. This structure allows the first and second cut-and-raised pieces 22, 23 to be more firmly engaged with each other than a case where the facing surfaces 22a and 23a are in point contact or line contact with each other.

(3) The first and second cut-and-raised pieces 22, 23 are formed by cutting and raising parts of the lower rail 3 and the upper rail 4. This structure reduces the number of components compared to a case where, for example, the first and second stoppers are provided as members separate from the lower rail 3 and the upper rail 4. Since the first and second cut-and-raised pieces 22, 23 receive the load generated when being engaged with each other in the shearing direction of each the cut-and-raised piece 22, 23, they have a sufficient strength compared to a case where, for example, the load is received in a bending direction. Particularly, since the inclination angles α, β prevent the first and second cut-and-raised pieces 22, 23 from being easily disengaged from each other, the load generated by the engagement is more reliably received in a shearing direction of each of the cut-and-raised pieces 22, 23. This allows the first and second cut-and-raised pieces 22, 23 to be small and thin, thereby reducing the size of the entire device.

Since the first and second cut-and-raised pieces 22, 23 can be made smaller, the cut portions 21 of the lower rail 3 (the bottom wall portion 12) and the cutout of the upper rail 4 can be made smaller accordingly. This prevents the strength of the lower rail 3 and the upper rail 4 from being lowered.

(4) Since the first and second cut-and-raised pieces 22, 23 are contained in the space defined by the lower rail 3 and the upper rail 4, the space is efficiently utilized. This adds to the flexibility of the arrangement.

The above described embodiments may be modified as follows.

In the above embodiments, the inclination angles α, β may be different from each other. For example, either one of the inclination angles α, β may be zero degrees. That is, only one of the facing surface 22a (22b) and the facing surface 23a, which engage each other, may have an inclination angle that allows the first and second cut-and-raised pieces 22, 23 to be more deeply engaged with each other.

In the above embodiments, two pairs of first cut-and-raised pieces 22 may be provided at positions spaced along the longitudinal direction of the lower rail 3 between two pairs of the second cut-and-raised pieces 23 arranged at both ends of the upper rail 4 in the longitudinal direction. In this case, adjusting the positions of two pairs of the first cut-and-raised pieces 22 along the longitudinal direction of the lower rail 3 adds to the setting flexibility of the movable range of the upper rail 4 relative to the lower rail 3.

In the above embodiments, the first cut-and-raised piece 22 may be provided at either end in the longitudinal direction of the lower rail 3, and one or a pair of the second cut-and-raised pieces 23 may be provided between the first cut-and-raised pieces 22.

In above embodiments, the first cut-and-raised piece 22 integrally formed with the lower rail 3 may be replaced by a separately formed plate-like first stopper having a similar function. Likewise, the second cut-and-raised piece 23 integrally formed with the upper rail 4 may be replaced by a separately formed plate-like second stopper having a similar function.

In the above embodiments, the cross-sectional shapes of the lower rail 3 and the upper rail 4 are not limited to the U-shape. For example, the cross-sectional shape of the upper rail 4 may be inverted T. Any cross-sectional shape may be applied as long as the first stopper (the first cut-and-raised piece) provided on the lower rail 3 and the second stopper (the second cut-and-raised piece) provided on the upper rail 4 have facing surfaces that are contactable to each other in the moving direction of the upper rail 4 relative to the lower rail 3.

The above embodiments may be configured with a single lower rail 3 and a single upper rail 4 provided in the seat portion 5. Alternatively, three or more lower rails 3 and the corresponding number of upper rails 4 may be provided in the seat portion 5.

In the above embodiments, the direction in which the seat is moved when the upper rail is moved relative to the lower rail may be the widthwise direction of the vehicle.

The invention claimed is:

1. A seat slide device comprising:
a lower rail adapted to be fixed to a floor of a vehicle;
an upper rail adapted to be fixed to a vehicle seat, the upper rail being supported by the lower rail to be movable relative to the lower rail;

a first stopper provided to the lower rail, the first stopper having a fixed end, which is fixed to the lower rail, and a free end; and a second stopper provided to the upper rail, the second stopper having a fixed end, which is fixed to the upper rail, and a free end, wherein the first and second stoppers each have a facing surface that faces and is contactable with the facing surface of the other stopper along the moving direction of the upper rail, the first and second stoppers being engaged with each other so as to limit the movement range of the upper rail relative to the lower rail, wherein, on at least one of the facing surfaces of the first and second stoppers, an inclination angle is provided that is inclined relative to a plane perpendicular to the moving direction of the upper rail such that the free end projects in the moving direction of the upper rail further toward the other facing surface than the fixed end.

2. The seat slide device according to claim 1, wherein the inclination angle is provided on each of the facing surfaces of the first and second stoppers, and the facing surfaces are in surface contact with each other when the first and second stoppers are engaged with each other.

3. The seat slide device according to claim 1, wherein the inclination angle is set so that when the first and second stoppers are engaged with each other, a load applied from one stopper to the other in the moving direction of the upper rail is dispersed in a direction toward the fixed end of the other stopper.

4. The seat slide device according to claim 1, wherein the first stopper is a first cut-and-raised piece that is formed by cutting and raising a part of the lower rail, wherein the second stopper is a second cut-and-raised piece that is formed by cutting and raising a part of the upper rail, and wherein the first and second cut-and-raised pieces are engageable with each other in a shearing direction of each cut-and-raised piece.

* * * * *